US006952318B1

United States Patent
Ngo (10) Patent No.: US 6,952,318 B1
(45) Date of Patent: Oct. 4, 2005

(54) SCALING LINEAR VIBRATION SENSOR DATA IN DISK DRIVE

(75) Inventor: Lan V. Ngo, Garden Grove, CA (US)

(73) Assignee: Western Digital Technologies, Inc., Lake Forest (*) Notice: Subject to any disclaimer, the term of this patent is extended or adjusted under 35 U.S.C. 154(b) by 34 days.

(21) Appl. No.: 10/769,444

(22) Filed: Jan. 30, 2004

(51) Int. Cl.[7] ............................................. G11B 19/02
(52) U.S. Cl. ....................................................... 360/69
(58) Field of Search .......................................... 360/69

(56) References Cited

U.S. PATENT DOCUMENTS 6,400,107 B1 * 6/2002 Nakatani et al. ............ 318/254

* cited by examiner

Primary Examiner—David Hudspeth
Assistant Examiner—Mitchell Slavitt
(74) Attorney, Agent, or Firm—Ramin Mobarhan, Esq.

(57) ABSTRACT

A method for reducing the effects of rotational vibration in a disk drive comprising generating a self-induced vibration in the disk drive, and sensing the self-induced vibration in the first and second sensors and generating a corresponding first and second sensor data. The method further comprises comparing the first and second sensor data to determine a gain-differential, and scaling at least one of the first and second sensor data to reduce the gain-differential between the first and second sensors.

11 Claims, 7 Drawing Sheets

SCALING LINEAR VIBRATION SENSOR DATA IN DISK DRIVE

FIELD OF THE INVENTION

This invention relates to mitigating the effects of vibration on a disk drive. More particularly, the present invention is directed to processing sensor data for mitigating vibration effects on a disk drive.

BACKGROUND OF THE INVENTION

Disk drives are commonly used to store large amounts of data in a readily available form. Typically, the primary components of a disk drive are a head disk assembly and a printed circuit board assembly (PCBA) which, when fixed to one another, form a functional unit that is then connected to a computer. The head disk assembly includes a head, an actuator arm, and a data storage disk that is rotated near the head by a spindle motor so that read/write operations may be performed on the disk.

A widely used measure of performance of a disk drive is the number of I/O operations performed by the disk drive. As such, it is essential that factors that adversely interfere with such operations be removed or reduced to within acceptable limits. One such adverse factor is rotational vibration. Rotational vibration can be induced due to a number of factors, such as when other disk drives in the same chassis spin or perform seek operations, or external forces on the rack or chassis containing the drive. When rotational vibration exceeds acceptable limits of a drive's tolerance, the head may be shaken off-track during the read/write operations, causing delays in the scheduled operations of the drive and resulting in overall performance degradations.

To reduce the effects of the rotational vibration, sensors are mounted on the disk drive, such as on the PCBA, to detect induced rotational vibration. Currently, linear sensors are preferred over rotary sensors in today's competitive market because of their significantly lower cost. The use of linear sensors, however, is not without shortcomings as it may require screening of sensors to minimize gain differential between sensors and a relatively close alignment of each sensor's sensitivity axis to reduce the occurrence of an apparent gain mismatch between the sensors. A gain mismatch can reduce the reliability of the data received from the sensors.

Accordingly, what is needed is a method for improving the cost and reliability associated with the use of linear sensors in disk drives.

SUMMARY OF THE INVENTION

This invention can be regarded as a method for reducing the effects of rotational vibration in a disk drive comprising a base, a cover, a disk being formatted with embedded servo sectors, a rotary actuator, a head affixed to the rotary actuator for reading the servo sectors, first and second sensors mounted for detecting acceleration of the disk drive, and a sampled servo control system for processing the detected acceleration and the servo sectors read by the head to control motion of the rotary actuator. The method includes generating a self-induced vibration in the disk drive; and sensing the self-induced vibration in the first and second sensors and generating a corresponding first and second sensor data.

The method further includes comparing the first and second sensor data to determine a gain-differential; and scaling at least one of the first and second sensor data to reduce the gain-differential between the first and second sensors.

DETAILED DESCRIPTION OF THE INVENTION

Figure 1A:
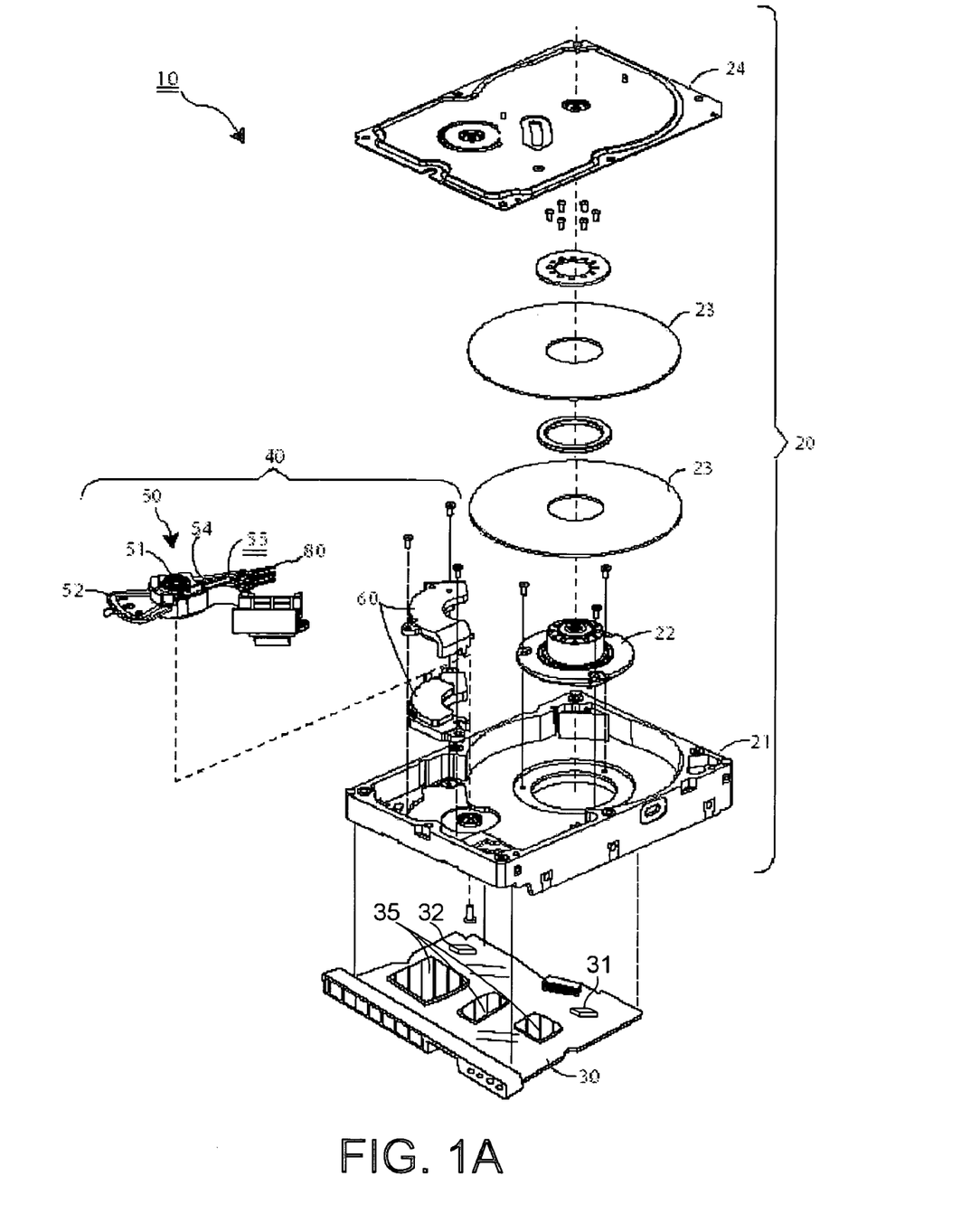
FIGS. 1A–B illustrate an exemplary hard disk drive in which the present invention may be practiced.

With reference to FIG. 1A, an exemplary hard disk drive 10 in which the present invention may be practiced is shown. As shown, the disk drive 10 comprises a head disk assembly (HDA) 20 including a base 21, one or more rotating disks 23 being formatted with embedded servo sectors (not shown), a rotary actuator 50 that pivots relative to the base 21, a head 80 affixed to the rotary actuator 50 for reading the servo sectors. The rotary actuator 50 rotates about a pivot axis extending through a center of a pivot cartridge 51 that secures the actuator 50 to the base 21, adjacent to disks 23. An actuator arm 54 extends to one side in order to carry the head 80 over a disk 23 for reading and writing data and a voice coil 52 extends from the other side for interacting with a pair of permanent magnets 60. The voice coil 52 and magnets 60 are frequently regarded as a "voice coil motor", or VCM 40. Disks 23 are rotated by a spindle motor 22. A cover plate 24 encloses the foregoing components in a cavity within the base 21.

As also shown in FIG. 1A, the disk drive 10 includes sensors 31 and 32 for detecting acceleration of the disk drive 10. Suitably, sensors 31 and 32 are mounted on a Printed Circuit Board Assembly (PCBA) 30 rigidly mounted to an underside of the base 21. The PCBA 30 also suitably contains a servo control system 35 for sample processing the detected acceleration and the servo sectors read by the head 80, and to control motion of the rotary actuator 50. Suitably, each of the sensors 31 and 32 comprises a linear accelerometer.

Figure 1B:
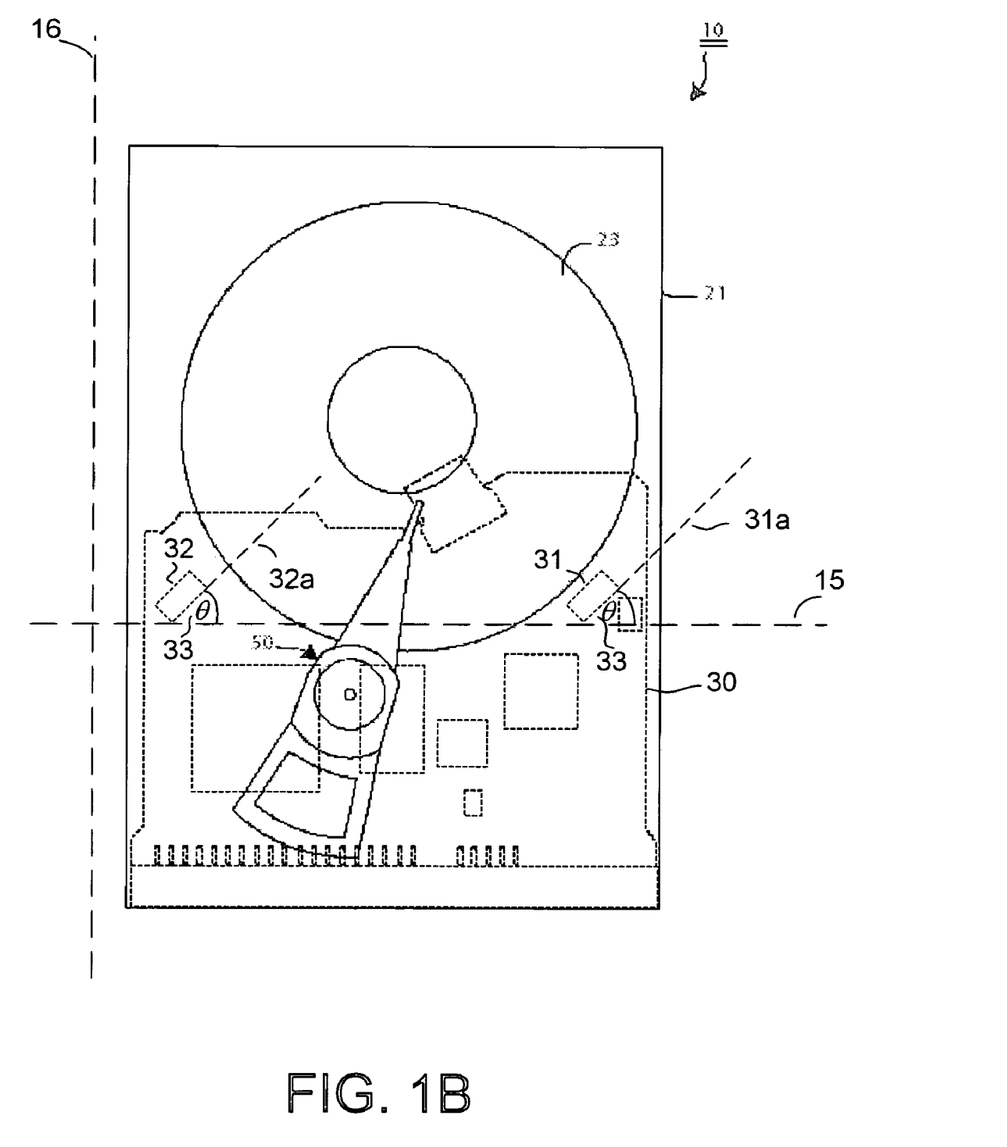

FIG. 1B is a simplified plan view of the disk drive 10 showing the PCBA 30 (in phantom) with sensors 31 and 32 mounted thereon. As shown, each of sensors 31 and 32 has a sensitivity axis represented by lines 31a and 32a, respectively. Currently in the prior art the use of sensors 31 and 32 may require screening of sensors 31 and 32 to minimize gain differential between sensors 31 and 32 and a relatively close alignment of each sensor's sensitivity axis 31a and 32a to reduce the occurrence of an apparent gain mismatch between the sensors. A gain mismatch can reduce the reliability of the data received from the sensors 31 and 32. As such, sensors 31 and 32 are oriented on the disk drive 10 with their sensitivity axes 31a and 32a at a pre-selected angle relative to an orthogonal axis 15 or 16 of the disk drive 10, such as at a pre-selected angle θ 33 (for example 45 degrees) to axis 15. Orthogonal axes 15 and 16 respectively generally correspond to x-axis and y-axis in a Cartesian coordinate system.

Figure 2A:
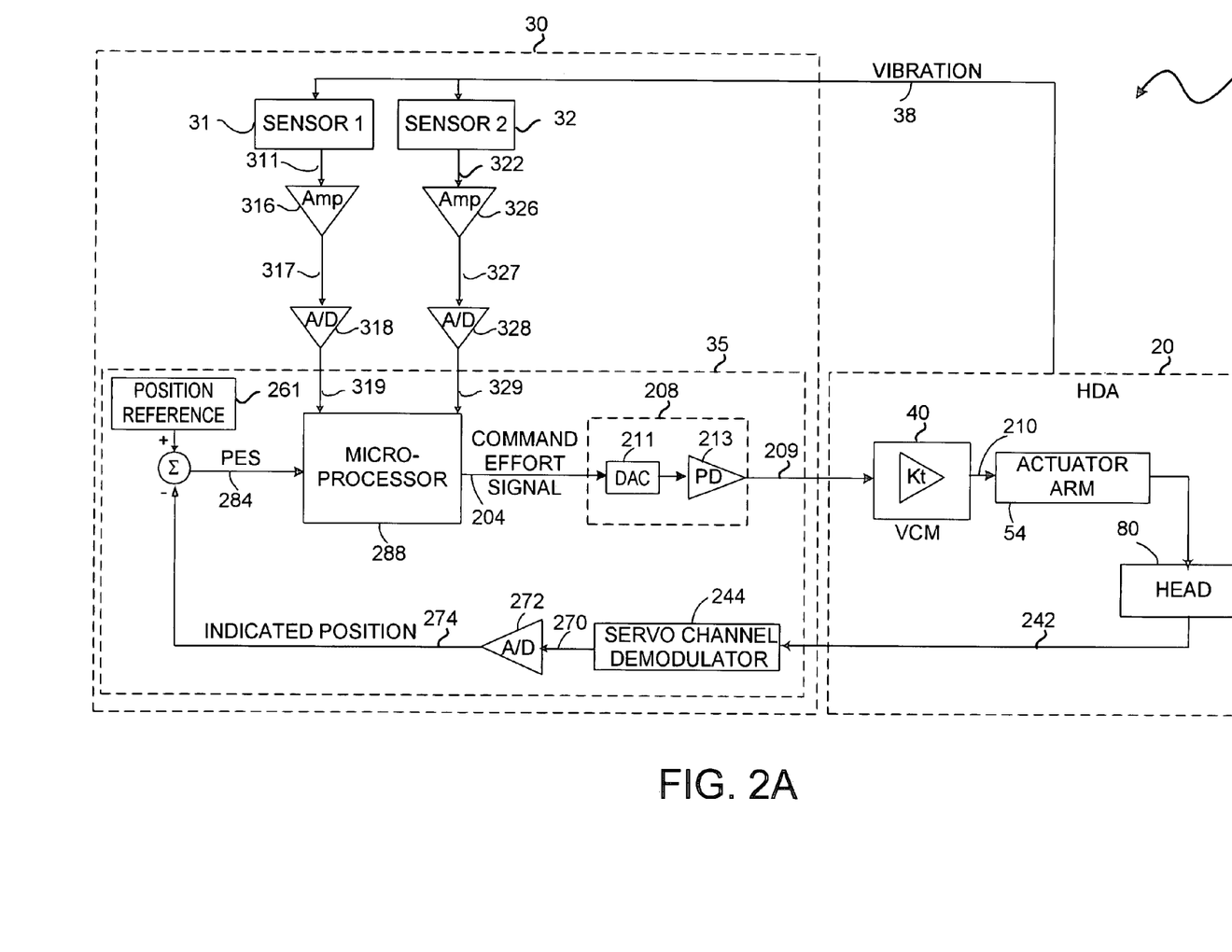
FIGS. 2A–B are block diagrams of a sampled servo control system disposed on the PCBA, an element of the exemplary hard disk drive shown in FIGS. 1A–B.
Figure 2B:
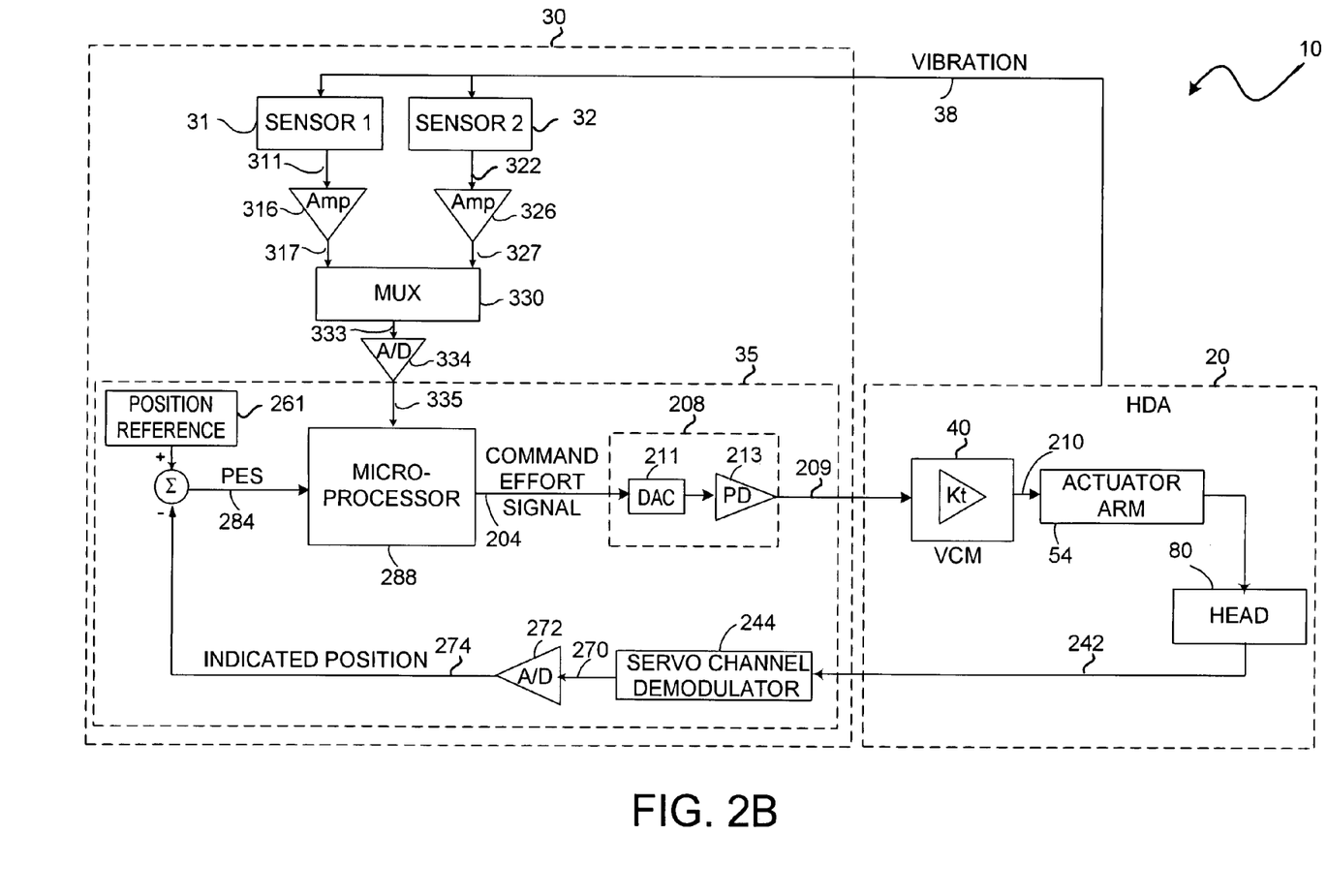

FIGS. 2A–B are block diagrams of a sampled servo control system 35 in PCBA 30 of the exemplary hard disk drive 10 shown in FIGS. 1A–B. As shown in FIGS. 2A–B, VCM 40 of HDA 20 is characterized by a torque output parameter 210. The servo control system 35 comprises a motor driver circuit 208 for receiving a series of command effort signals 204 from microprocessor 288. Suitably, the motor driver circuit 208 comprises a digital to analog converter (DAC) 211 and a power driver (PD) 213, such as a power driver circuit. The motor driver circuit 208 provides an operating current 209 to VCM 40 based on the command effort signals 204 for causing the actuator arm 54 to carry the head 80 over a disk 23. Suitably, the location of the head 80, indicated by head location signal 242, is concurrently monitored by a servo channel demodulator 244 which outputs an analog signal 270 corresponding to the head location signal 242 that is typically converted to a digital signal 274 by an analog to digital converter (ADC) 272. The digital signal 274 corresponds to an indicated track position and off-track percentage value. The digital signal 274 is then combined with a signal corresponding to a position reference 261 to generate a position error signal (PES) 284 that is received by the microprocessor 288.

In the exemplary embodiments shown in FIGS. 2A–B, the disk drive 10 further comprises amplifiers 316 and 326, adapted to receive sensor data 311 and 322, respectively, and to output amplified signal 317 and 327, respectively. Sensor data 311 and 322 are generated by the sensors 31 and 32, respectively, in response to sensing of self-induced rotational vibration disturbance 38 affecting the PCBA 30 and HDA 20. Suitably sensors 31, 32 are adjustable gain sensors that include amplifiers 316 and 322.

In the exemplary embodiment shown in FIG. 2A, amplified analog sensor data 317 and 327 are digitized by ADCs 318 and 328 respectively, and outputted as digitized sensor data 319 and 329, respectively, where they are received by microprocessor 288. In the exemplary embodiment shown in FIG. 2B, amplified analog sensor data 317 and 327 are inputted in the multiplexing unit 330, which then forwards (via line 333) each of the sensor data 317 and 327 to the ADC 334 in an alternating manner at where they are digitized and inputted into the microprocessor 288 via line 335. Suitably the multiplexing unit 330 alternates the forwarding of each of sensor data 317 and 327 based on an alternating servo-sample signal (not shown) received from sampled servo control system 35.

Figure 3:
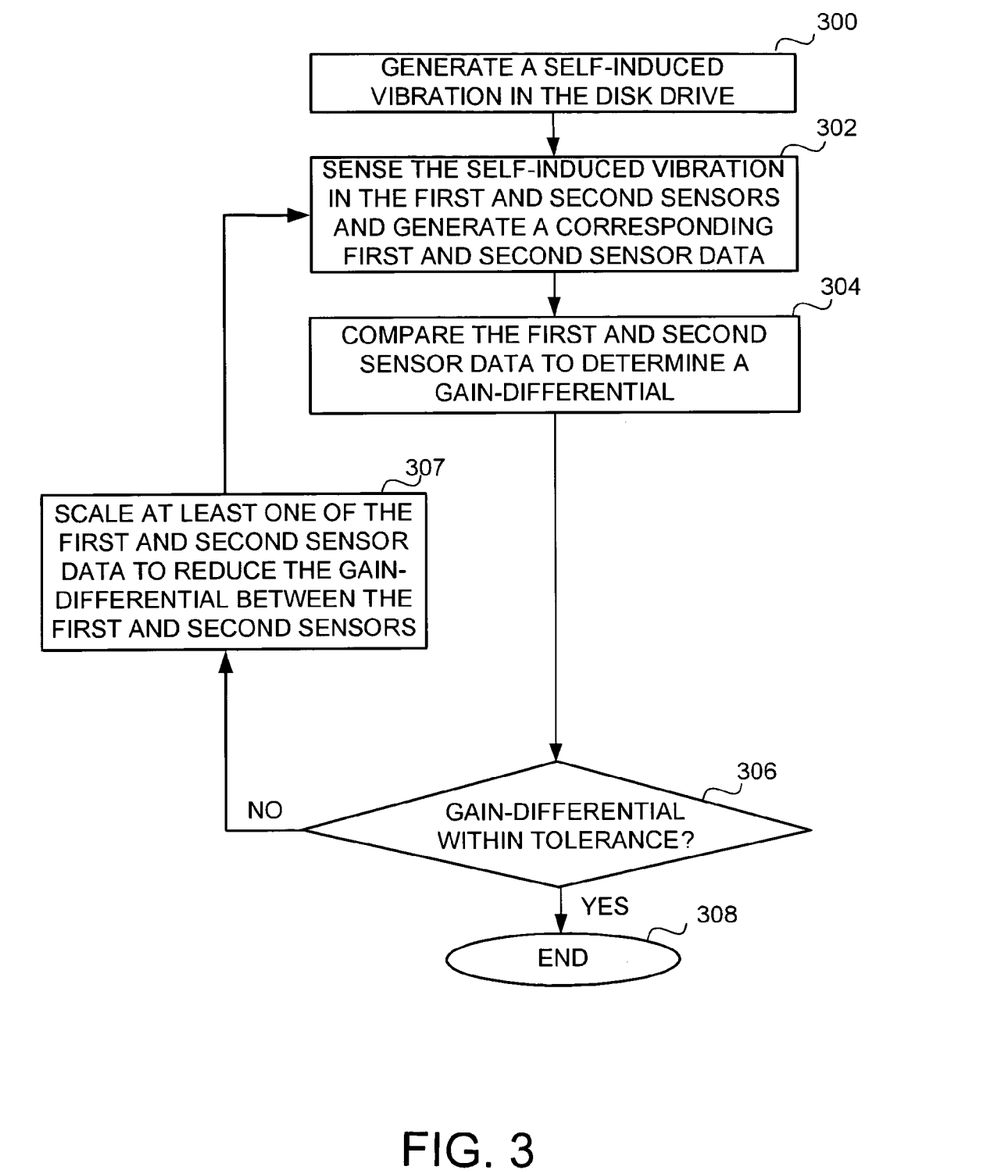
FIG. 3 is a flow chart illustrating a process used in an embodiment of the invention shown in FIG. 2.

FIG. 3, in conjunction with FIGS. 2A–B, illustrates a process of the present invention for reducing the effects of rotational vibration 38 in a disk drive 10. The process begins at block 300 where a self-induced vibration 38 is generated in the HDA 20 of the disk drive 10. Suitably the self-induced vibration 38 is generated by a performing a vibration-inducing seek operation in HDA 20, as described in greater detail in conjunction with FIGS. 5A–B. Next, in block 302, the self-induced vibration 38 is sensed in the sensors 31 and 32 which generate the corresponding sensor data 311 and 322 which are then inputted into the microprocessor 288, in their digitized forms in the above-described manner. Next, in block 304, the digital representations of sensor data 311 and 322 are compared to determine a gain-differential. Next, in decision block 306 if it is determined that the gain-differential is within a pre-selected tolerance level, the flow proceeds to block 308 where the overall process ends. If in decision block 306 if it is determined that the gain-differential is not within a pre-selected tolerance level, then the flow proceeds to block 307 where one or both of the digitized sensor data 317 and 327 are scaled (as described in greater detail in conjunction with FIGS. 4A–B below) to reduce the gain-differential between the sensors 31 and 32. Suitably, the scaling is performed during an initialization process of the disk drive 10 such as during an initial burn-in (IBI) process or a disk drive power-up process.

Figure 4A:
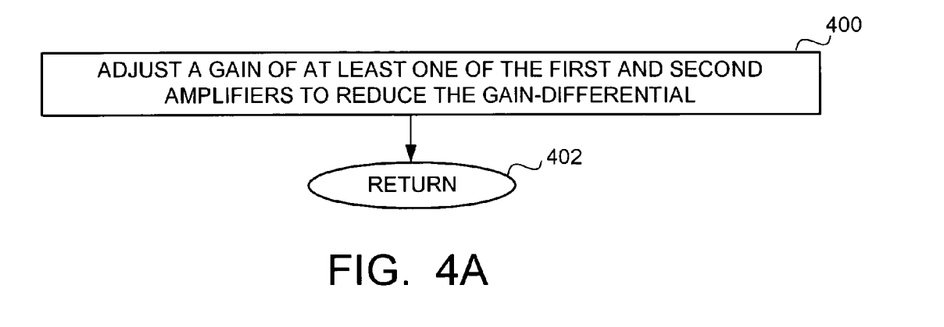
FIGS. 4A–B are flow charts illustrating processes used in conjunction with the process shown in FIG. 3.
Figure 4B:
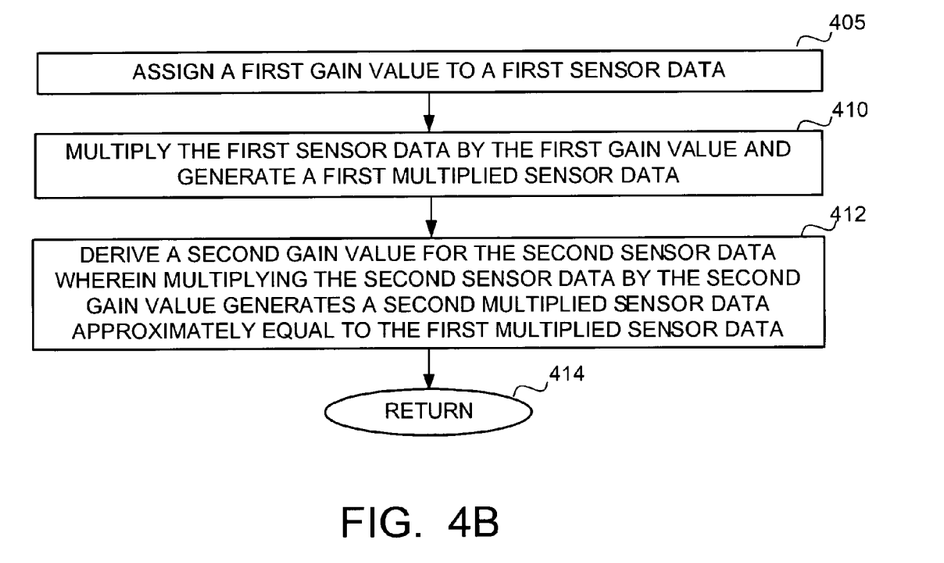

FIGS. 4A–B are flow charts illustrating the scaling process used in block 307 of FIG. 3. In FIG. 4A, an exemplary scaling process begins in block 400 where the gain of at least one of the amplifiers 316 and 326 is adjusted to reduce the gain-differential determined in block 304 of FIG. 3. Suitably, the gain adjustment causes a difference result of the amplified sensor data 317 and 327 to be practically zero. The flow then proceeds to block 402 for return to block 307 of FIG. 3.

In FIG. 4B, an exemplary scaling process is performed by firmware and begins in block 405 where a first gain value is assigned to a first sensor data, such as digitized value 319. Suitably the first gain value is assigned as an arbitrary gain of 1. Next, in block 410, the first sensor data is multiplied by the first gain value to generate a first multiplied sensor data. Next, in block 412, a second gain value is derived for the second sensor data, such as digitized value 329, wherein multiplying the second sensor data by the second gain value generates a second multiplied sensor data approximately equal to the first multiplied sensor data; i.e. digitized value 329 is scaled to match digitized value 319. For example, if the received digitized values 319 and 329 represent 110 mV and 100 mv respectively, digitized value 319 may be assigned a nominal gain of 1. A gain of 1.1 is derived for the digitized value 329 such that each time a digitized value 329 is received, the scaling procedure multiplies it by 1.1 to achieve a relatively zero gain differential between digitized values 319 and 329 which are representative of sensor data 311 and 322. The flow then proceeds to block 414 for return to block 307 of FIG. 3. It should be noted that other scaling methods, such as scaling both gain values to a third value, is also contemplated to be within the scope of the present invention.

One advantage of the foregoing feature of the present invention over the prior art is that by scaling the sensor data, the need for a relatively close alignment of each sensor's sensitivity axis 31a and 32a to reduce the occurrence of an apparent gain mismatch between the sensors is reduced.

Figure 5A:
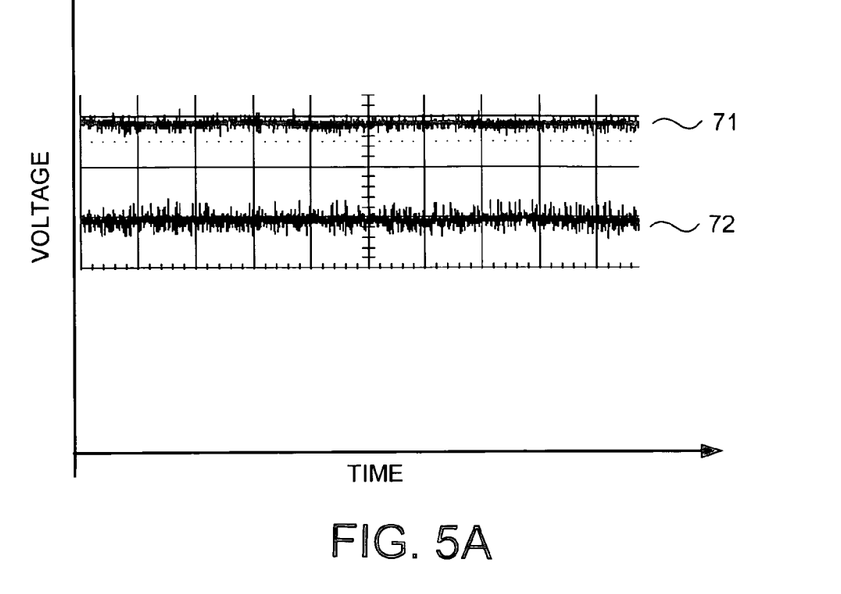
FIGS. 5A–B are waveforms illustrating sensor data received from sensors 31 and 32 before and during self-induced vibration and a corresponding gain differential.
Figure 5B:
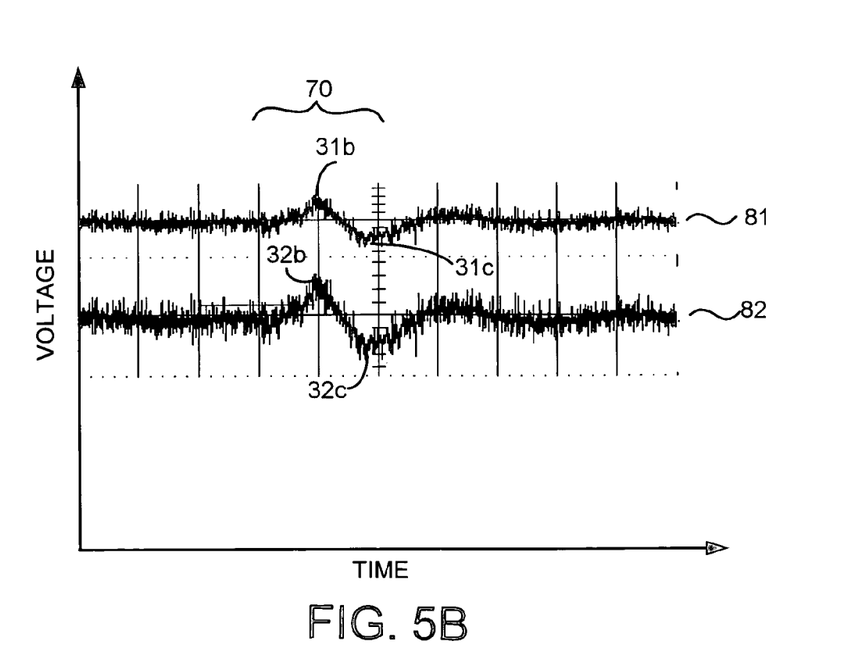

FIGS. 5A–B illustrate the effects of the self-induced vibration 38 generated in block 300 of FIG. 3 and the aforementioned gain-differential between sensor data 311 and 322. In FIG. 5A, waveforms 71 and 72 corresponding to sensor data 311 and 322 received from sensors 31 and 32 respectively, are shown prior to the self-induced vibration 38. As shown, each of the waveforms 71 and 72 are at a relatively flat-lined state, indicating vibrations that are within pre-selected tolerance levels of the disk drive 10. In FIG. 5B, the waveforms 81 and 82 corresponding to sensor data 311 and 322, respectively, are made during the self-induced vibration 38, such as vibration generated by performing a seek operation. As shown, the waveforms 81 and 82 now exhibit relatively pronounced peaks and valleys, such as peak 31b and valley 31c in waveform 81 or peak 32b and valley 32c in waveform 82, indicating vibration disturbances caused by the self-induced vibration 38. As further shown in FIG. 5B, for an exemplary seek operation performed during a time period 70, peak 32b and valley 32c attain different amplitudes relative to peak 31b and valley 31c, respectively, for the same self-induced vibration 38 which indicates a gain differential at amplified sensor data nodes 317 and 327. The gain differential can be due to gain variables of sensors 31, 32 or amplifiers 316,326 for example.

It should be noted that the various features of the foregoing embodiments were discussed separately for clarity of description only and they can be incorporated in whole or in part into a single embodiment of the invention having all or some of these feature

What is claimed is:

1. In a disk drive comprising a base, a cover, a disk being formatted with embedded servo sectors, a rotary actuator, a head affixed to the rotary actuator for reading the servo sectors, first and second sensors mounted for detecting acceleration of the disk drive, and a sampled servo control system for processing the detected acceleration and the servo sectors read by the head to control motion of the rotary actuator, a method for reducing the effects of rotational vibration in the disk drive, the method comprising:
   generating a self-induced vibration in the disk drive;
   sensing the self-induced vibration in the first and second sensors and generating a corresponding first and second sensor data;
   comparing the first and second sensor data to determine a gain-differential; and
   scaling at least one of the first and second sensor data to reduce the gain-differential between the first and second sensors.

2. The method of claim 1, wherein the self-induced vibration is generated by performing a seek operation.

3. The method of claim 1, wherein the disk drive further comprises:
   a first amplifier adapted to receive from the first sensor a first signal corresponding to the first sensor data; and
   a second amplifier adapted to receive from the second sensor a second signal corresponding to the second sensor data.

4. The method of claim 3, the scaling further comprising:
   adjusting a gain of at least one of the first and second amplifiers to reduce the gain-differential.

5. The method of claim 1, wherein the scaling is performed by firmware.

6. The method of claim 5, wherein the scaling performed by the hardware comprises:
   assigning a first gain value to the first sensor data;
   multiplying the first sensor data by the first gain value and generating a first multiplied sensor data; and
   deriving a second gain value for the second sensor data wherein multiplying the second sensor data by the second gain value generates a second multiplied sensor data approximately equal to the first multiplied sensor data.

7. The method of claim 1, wherein the scaling is performed during an initialization process of the disk drive.

8. The method of claim 7, wherein the initialization process is an initial burn-in process.

9. The method of claim 7, wherein the initialization process is a disk drive power-up process.

10. The method of claim 1, wherein each of the first and second sensors comprises a linear accelerometer.

11. The method of claim 1, wherein the disk drive further comprises a printed circuit board assembly (PCBA) and wherein the first and second sensors are mounted on the (PCBA).

* * * * *